United States Patent [19]

Tresser

[11] 4,085,489

[45] Apr. 25, 1978

[54] PROCESS FOR FABRICATING HOLLOW RACES OR WHEELS PROVIDED AT THEIR LATERAL ENDS WITH AXLE STUMPS IN WHICH PROCESS SUBSTANTIALLY NO CHIPS ARE PRODUCED; AND RACES AND WHEELS MANUFACTURED IN ACCORDANCE WITH THIS PROCESS

[75] Inventor: Dietfried Tresser, Gusterath, Germany

[73] Assignee: Laeis-Werke AG., Trier, Germany

[21] Appl. No.: 786,279

[22] Filed: Apr. 11, 1977

[30] Foreign Application Priority Data

Apr. 10, 1976 Germany .............................. 2615738

[51] Int. Cl.² ............................................. B21B 27/02
[52] U.S. Cl. ..................................... 29/110; 29/129.5; 29/148.4 D; 72/367
[58] Field of Search ................. 29/148.4 D, 110, 115, 29/129.5; 72/367

[56] References Cited

U.S. PATENT DOCUMENTS

| 159,643 | 2/1875 | Cavalier | 29/129.5 |
| 2,061,300 | 11/1936 | Daniels | 29/110 |

Primary Examiner—Lowell A. Larson

[57] ABSTRACT

A roller including a hollow cylindrical pipe portion having an outer diameter corresponding to that of the roller and having axle stump portions which have axial cylindrical end portions. The axle stump portions being at least partially frusto-conically shaped and being connected to the pipe portion via S-shaped radially inwardly bent portions. The pipe portion and S-shaped portions being of unitary construction and the axle stump portions being welded to this unitary construction.

A process for producing rollers and the like having axle stumps at both of their axial ends from hollow cylindrical pipe pieces. The process includes the steps of reducing and deforming both axial ends of the pipe piece to form frusto-conical end portions. The pipe piece has an outer diameter corresponding to that of the roller. The shaping and deformation is carried out by means of a pipe deforming machine. Thereafter the frusto-conical end portions are partially bent radially inwardly so as to form S-shaped intermediate portions between the pipe portion and the axle stump portions.

8 Claims, 2 Drawing Figures

PROCESS FOR FABRICATING HOLLOW RACES OR WHEELS PROVIDED AT THEIR LATERAL ENDS WITH AXLE STUMPS IN WHICH PROCESS SUBSTANTIALLY NO CHIPS ARE PRODUCED; AND RACES AND WHEELS MANUFACTURED IN ACCORDANCE WITH THIS PROCESS

BACKGROUND OF THE INVENTION

The present invention relates to a process for fabricating cylindrical, hollow races, rollers or wheels having axle stumps at their lateral ends. This novel fabricating process is capable of producing the end product without the accompanying chips that fall off in the conventional machining process. The invention relates to a special race made in accordance with this process.

The aforedescribed types of races or rollers were heretofore made out of piping cut to the desired supporting length. After the cutting step plates were welded to both lateral sides of the roller and to those plates the axle stumps are then affixed. The axle stumps serve as the inner seat of a roller bearing and also as the seat for a drive pinion. It was necessary in the manufacture of the aforedescribed prior art devices to utilize mechanical tools which produce chips, in order to achieve a corresponding manufacturing precision with a minimal knocking and with a corresponding snug fit. Furthermore, it was generally necessary to subject the entire roller subsequent to the manufacturing process to a straightening process. The disadvantages of this prior art manufacturing process reside in that a plurality of parts must be separately manufactured and joined and worked upon.

SUMMARY OF THE INVENTION

It is an object of this invention to provide a manufacturing process wherein the aforedescribed disadvantages are avoided and in which the aforedescribed races and rollers are fabricated without the production of chips. With the process of the invention therefore there can be produced a finished roller in a simple and economical manner having a high running precision. It is a further object of this invention to provide a process by means of which the running rollers can be produced without accompanying chips.

BRIEF DESCRIPTION OF THE DRAWING

The objects of the invention as well as the process for making the races, rollers and wheels and the running rollers, wheels and races themselves will now be explained in detail in conjunction with the accompanying drawings, wherein there is illustrated.

DETAILED DESCRIPTION

Figure 1:
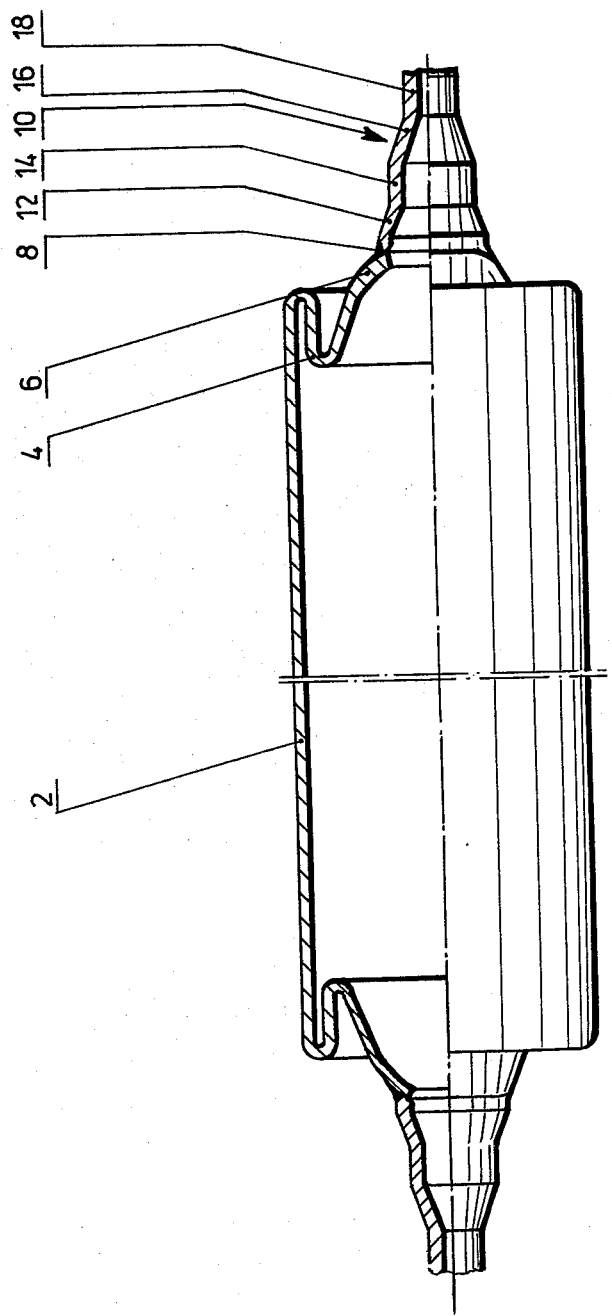
FIG. 1 illustrates a running roller in accordance with the invention.
Figure 2:
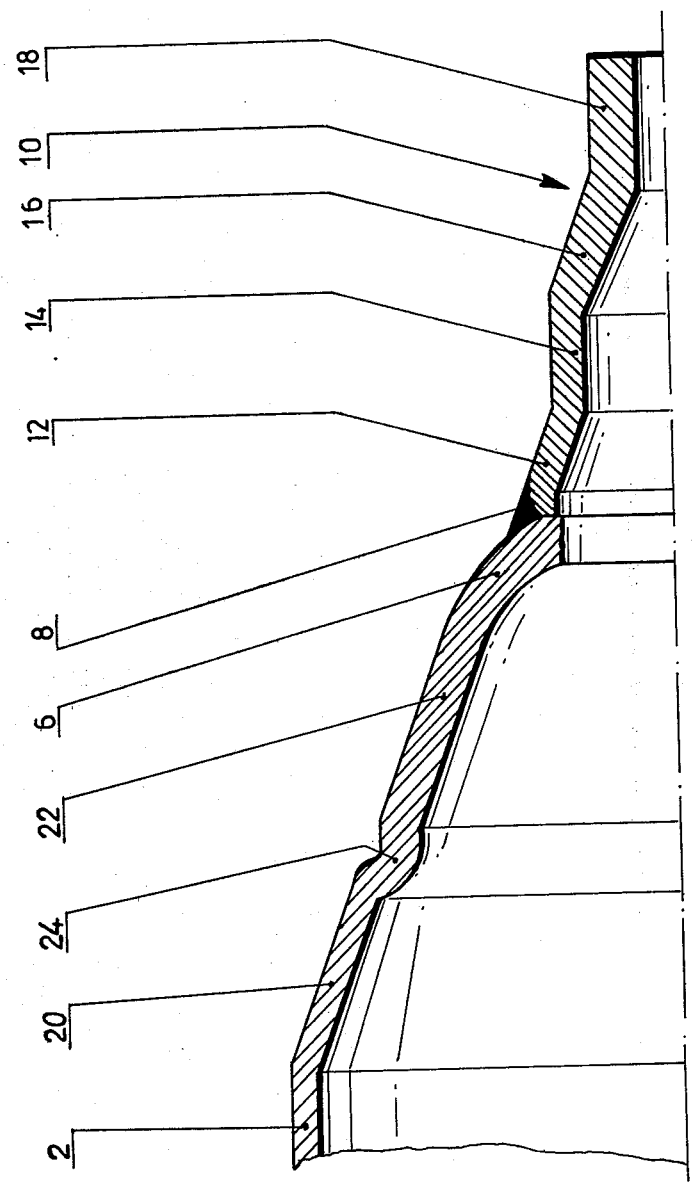
FIG. 2 illustrates the end of a roller of the invention which has been reshaped in accordance with the process of the invention before the turning-in, bending and crimping step has been carried out.

As can be clearly recognized from FIG. 1 of the drawing, the running roller consists of a pipe portion 2, made out of a conventional pipe material, the exterior diameter of which corresponds to that of the running roller. At the end of the running roller pipe 2 there is provided a turned-in or bent-in portion 4 which adjoins a bulging portion 6 adapted to act as a ball race. The axle stump 10 is affixed to the bulging portion 6 by means of a fillet weld 8. The axle stump 10 includes a conical portion 12, a hexagonal portion 14, a further conical portion 16 and a cylindrical end piece 18 for receiving a roller bearing. There will now be explained in detail the shaping of the turned-in portion 4 and the axle stump 10 which is provided at both ends of the running roller tube 2, particularly in conjunction with FIG. 2 of the drawing. Turning-in of the portion 4 and the shaping of the axle stump 10 is carried out with the aid of a pipe shaping or deforming machine. The pipe shaping machine can, for example, be a pressing machine as described in the publication "Maschinenmarkt", 70th year edition (1964) No. 73 on page 88.

The shaping is carried out in eight drawing or rolling steps. A corresponding shaping tool is provided in the revolving head of the pipe deforming machine for each drawing, pressing or rolling step, the head being pressed on the pipe end. First of all the pipe ends are reduced to about half the running roller diameter by means of two drawing steps. By means of this shaping process there result the two frusto-conical sections 20, 22 with increased wall thickness at the pipe ends. Thereafter, the running roller pipe 2 is returned to the clamping portion of the pipe shaping machine, so that the transfer region from the running roller pipe 2 to the conical portion 20 is positioned within the clamping jaw and thereafter during a third drawing or rolling step the bulging portion 6 is shaped. Resetting of the roller pipe 2 into the clamping jaw is necessary, because during the shaping of the bulging portion 6 very large forces appear and an undesirable wrinkling in the region between the roller pipe and the conical portion 20 could appear. In the fourth drawing or rolling step the inwardly bulging portion 24 is formed which constitutes a transistion portion between frusto-conical shaped portions 20 and 22. The transition portion 24 serves to facilitate the initiating of the turning-in and bending-in process of the portion 4 so that its diameter corresponds to the inwardly bent onto itself portion 4 in the direction of the axle stump 10.

In the aforedescribed process the running roller consists of the running roller pipe 2 and the welded-on axle stump portion 10. This type of construction has been selected so that to permit the shaping despite the vast dimensional difference between the diameter of the roller pipe 2 and the diameter of the cylindrical end piece 18, which shaping can be carried out without a normal annealing process. In the event there exists the possibility for carrying out a normal annealing during the third drawing or rolling step, then obviously the entire running roller can be made of unitary construction without the necessity of welding on to it the axle stump portion 10.

In the aforedescribed and illustrated example there is welded, after the third drawing step, a cylindrical piece of pipe onto the bulging portion 6 so that the fillet weld 8 results. In the event a large number of rollers are produced it is of course understood that a circular welding machine is used in this step.

After the welding of the cylindrical pipe piece has occurred, the entire assembly is re-shaped between a fourth to an eighth drawing step so that the conical portion 12, the hexagonal portion 14, a further conical portion 16 and the cylindrical end piece 18 are finally shaped. It should be noted that in the eighth drawing step the hexagonal portion 14 is formed from a cylindrical piece that is situated between the frustoconical portions 12 and 16. The eighth drawing step also serves to calibrate the cylindrical end piece 18 and to exactly axially position it relative to the roller pipe 2, so that after the roller pipe 2 has again been reset into the clamping jaws the transfer region between the roller pipe 2 and the conical portion 20 is positioned within the clamping jaws, thereby the crimped portion 4 being ready to be drawn and shaped. This shaping process, as mentioned hereinabove, is facilitated by the inwardly bulging portion 24 which surrounds the entire periphery of the to be shaped pipe portion. Further, the resetting of the roller pipe 2 into the clamping jaws serves to avoid an exterior wrinkling which may appear due to the very large forces that are present in the shaping process, in particular in the crimping and turning inward step of the shaping process.

As can be noted there is produced in accordance with the process of this invention a running roller, which is fabricated without the usual accompanying production of chips and which corresponds in its dimension to those of the conventional running rollers and can be produced completely automatically.

Although the invention is illustrated and described with reference to a plurality of preferred embodiments thereof, it is to be expressly understood that it is in no way limited to the disclosure of such a plurality of embodiments, but is capable of numerous modifications within the scope of the appended claims.

I claim:

1. An improved process for producing a roller and the like, having axle stumps at both of their ends, from hollow cylindrical pipes, the improvement comprising the steps of conically reduced and shaping opposite end portions of a pipe, having an exterior diameter corresponding to that of the roller, by means of a pipe shaping machine; and thereafter bending inwardly into said pipe said conically shaped end portions.

2. The improved process as set forth in claim 1, wherein the axial end portions of the pipe are first reduced to about half the diameter of the roller, thereafter each of said reduced axial end portions are annealed and are further reduced into a cylindrical end portion forming a journal of preselected diameter; and thereafter said bending-in step is carried out.

3. The improved process as set forth in claim 1, wherein the axial end portions of the pipe are first reduced to about half the diameter of the roller thereby forming a pair of frusto-conical end portions, thereafter a pipe piece of about half the diameter of the roller is coaxially welded onto each frusto-conical axial end portion of the pipe, thereafter the welded onto pipe pieces are reduced in diameter into a cylindrical end portion forming a journal of preselected diameter; finally said frusto-conical end portions are bent radially inwardly so as to form substantially S-shaped portions.

4. The improved process as set forth in claim 3, including the step of forming a radially inwardly extending groove in said frusto-conical end portions to facilitate the subsequent step of radially inwardly bending said frusto-conical end portions.

5. The improved process as set forth in claim 4, wherein a radially outwardly bulging portion is formed in each of said frusto-conical end portions against which said pipe pieces are welded.

6. The improved process as set forth in claim 5, wherein the shaping and conically reducing of the pipe is carried out by means of a pipe deforming machine having a revolving head and clamping jaws, the ends of the hollow cylindrical pipe being deformed in the first two drawing steps into frusto-conical end portions, the smallest diameter of which is about equal to half the diameter of the pipe, said radially outwardly bulging portion being deformed in a third drawing step, said welding step being effected thereafter, said radially inwardly extending groove being effected in a fourth drawing step, said reduction and deformation into cylindrical end portions forming journals of said pipe pieces being effected in fifth to seventh drawing steps, and in an eighth drawing step an intermediate portion of said pipe pieces being deformed into a shape of predetermined cross-section; said cylindrical end portions thereafter being calibrated, said radial inward bending of said frusto-conical end portions into substantially S-shaped portions being effected thereafter, thereafter said cylindrical end portions being exactly coaxially aligned with said roller, whereby the clamping jaws are sufficiently retracted between the third and eighth drawing step so that the region of the pipe adjoining the frusto-conical end portions is disposed between the clamping jaws thereby avoiding a wrinkling during formation of the radially outwardly bulging portion.

7. A roller and the like having axle stumps at both of its axial ends, comprising a cylindrical pipe portion having an outer diameter corresponding to that of the roller, said axle stumps being partially frusto-conically shaped and having cylindrical axial end portions, said cylindrical pipe portion and said axle stump portions being connected to each other via S-shaped radially inwardly bent portions.

8. The roller and the like as set forth in claim 7, wherein said cylindrical pipe portion and said S-shaped radially inwardly bent portions form one unitary construction, and said axle stump portions are welded onto said unitary construction.

* * * * *